Patented Nov. 7, 1933

1,933,987

UNITED STATES PATENT OFFICE 1,933,987

PROCESS FOR MAKING 1.6-DIBROMO-2-HYDROXY-NAPHTHALENE-3-CARBOXYLIC ACID

Leopold Laska and Johannes Wollemann, Offenbach-on-the-Main, Germany, assignors to General Aniline Works, Inc., New York, N. Y., a corporation of Delaware No Drawing. Application December 24, 1931, Serial No. 583,146, and in Germany January 6, 1931

2 Claims. (Cl. 260—111)

Our present invention relates to an improved process for making 1.6-dibromo-2-hydroxy-naphthalene-3-carboxylic acid.

The production of 1.6-dibromo-2-naphthol by the action of 4 atomic proportions of bromine on 1 molecular proportion of 2-hydroxynaphthalene has been described by Franzen and Stäuble in "Journal für praktische Chemie" (new series), vol. 103 (1921–22), pages 368–9. From German Specification No. 396,519, page 1, lines 46 to 50, it is to be inferred that 2-hydroxynaphthalene-3-carboxylic acid, when treated in like manner, would yield 1.6-dibromo-2-hydroxynaphthalene-3-carboxylic acid.

This acid may also be prepared according to Berichte der Deutschen Chemischen Gesellschaft, vol. 58 (1925) page 2850 by acting with an excess of bromine on monobromo-2-hydroxynaphthalene-3-carboxylic acid.

Our present process avoids the use of such large proportions of bromine. It comprises dissolving 2-hydroxy-naphthalene-3-carboxylic acid in sulfuric acid and adding to the solution 2 to 2.1 atomic proportions of bromine. When 2 atomic proportions of bromine are used hydrogen bromide is disengaged which is introduced into fuming sulfuric acid and again added in the form of this solution to the reaction mass. The fuming sulfuric acid used in the latter case may contain an amount of $SO_3$ less than that theoretically required, since sulfuric acid itself forms some bromine from hydrogen bromide.

In order to further illustrate our invention the following examples are given, the parts being by weight and all temperatures in centigrade degrees, but we wish it however to be understood that we are not limited to the particular products or reaction conditions mentioned therein.

Example 1

75.2 parts of 2-hydroxy-naphthalene-3-carboxylic acid are introduced into 400 parts of sulfuric acid of 95% strength. While cooling with ice and common salt, 65 parts of bromine are slowly added at −5° during 2 hours. Then the temperature is allowed to raise gradually to room temperature. After 20 hours' standing the temperature is further raised to 50° during 6 hours and maintained there until the melting point of a test which has been precipitated with water shows the end of the reaction. Then the mass is poured into water and filtered. The residue is washed with water until neutral and dried.

Example 2

151 parts of 2-hydroxy-naphthalene-3-carboxylic acid are introduced into 650 part of sulfuric acid of 95% strength. While cooling with ice and common salt, 129 parts of bromine are slowly added at 0° to −5°. The hydrogen bromide which forms thereby is introduced into 320 parts of fuming sulfuric acid containing 20% of $SO_3$. This absorption liquor is slowly added to the reaction mass at the same temperature. Then the whole is allowed to warm to room temperature and further stirred for some hours until the end of the reaction. Thereafter the mass is poured into 2000 parts of ice-water and filtered. The residue is washed with water until neutral and dried.

We claim:

1. Process which comprises dissolving 2-hydroxynaphthalene-3-carboxylic acid in sulfuric acid and adding to the solution an amount of bromine ranging from 2 to 2.1 atomic proportions.

2. Process which comprises dissolving 2-hydroxy-naphthalene-3-carboxylic acid in sulfuric acid of 95% strength, adding thereto 2 atomic proportions of bromine, introducing the disengaged hydrogen bromide into fuming sulfuric acid and adding the fuming sulfuric acid thus treated to the reaction mass.

LEOPOLD LASKA.
JOHANNES WOLLEMANN.